(No Model.) 2 Sheets—Sheet 1.

F. H. HAWKINS.
APPARATUS FOR COLLECTING AND CONVEYING ASHES, &c.

No. 397,718. Patented Feb. 12, 1889.

Attest:
A. N. Jesbera
E. M. Watson

Inventor:
Frederick H. Hawkins
By David A. Burr
Atty.

(No Model.) 2 Sheets—Sheet 2.

F. H. HAWKINS.
APPARATUS FOR COLLECTING AND CONVEYING ASHES, &c.

No. 397,718. Patented Feb. 12, 1889.

Attest:
A. N. Jenkins
E. M. Watson

Inventor:
Frederick H. Hawkins
By David A. Burr,
Atty.

United States Patent Office.

FREDERICK H. HAWKINS, OF NEW YORK, N. Y.

APPARATUS FOR COLLECTING AND CONVEYING ASHES, &c.

SPECIFICATION forming part of Letters Patent No. 397,718, dated February 12, 1889.

Application filed August 16, 1888. Serial No. 282,933. (No model.)

*To all whom it may concern:*

Be it known that I, FREDERICK H. HAWKINS, of the city, county, and State of New York, have invented certain new and useful Improvements in Appliances for Collecting and Conveying Ashes, Street-Sweepings, and other Refuse Matter in Towns and Cities; and I do hereby declare that the following is a full and exact description thereof, reference being had to the accompanying drawings, and to the letters of reference marked thereon, making a part of this specification, in which—

Figure 1:
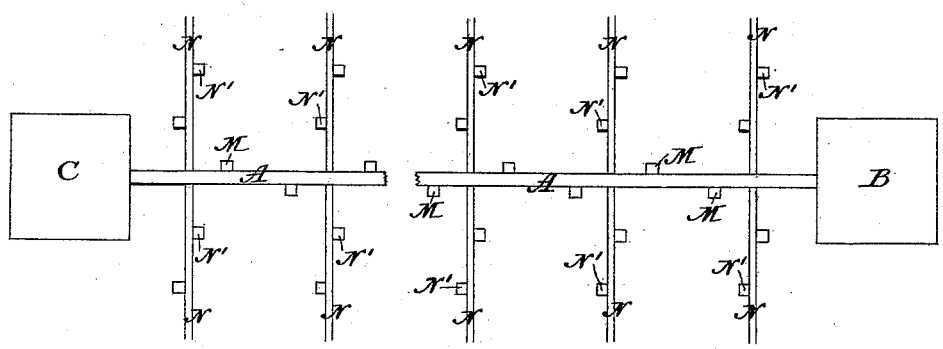
Figure 2:
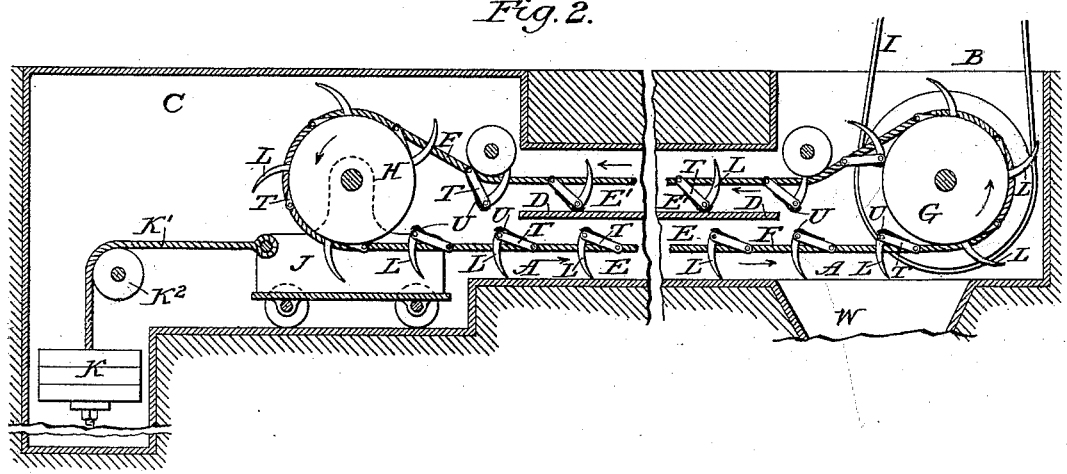
Figure 3:
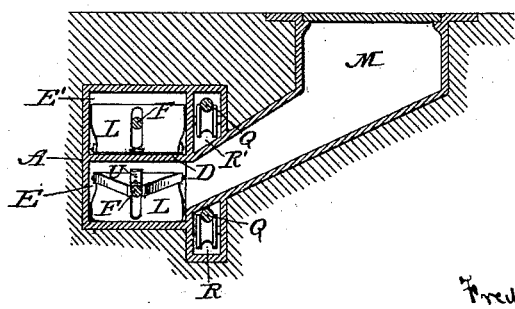
Figure 4:
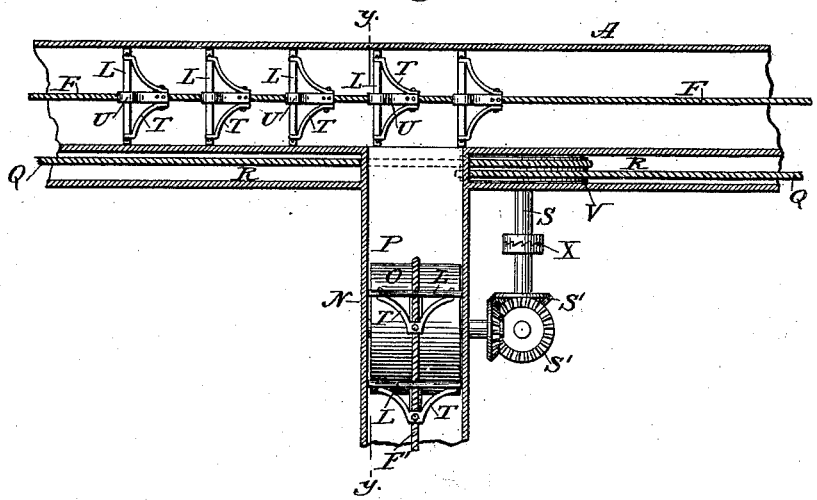
Figure 5:
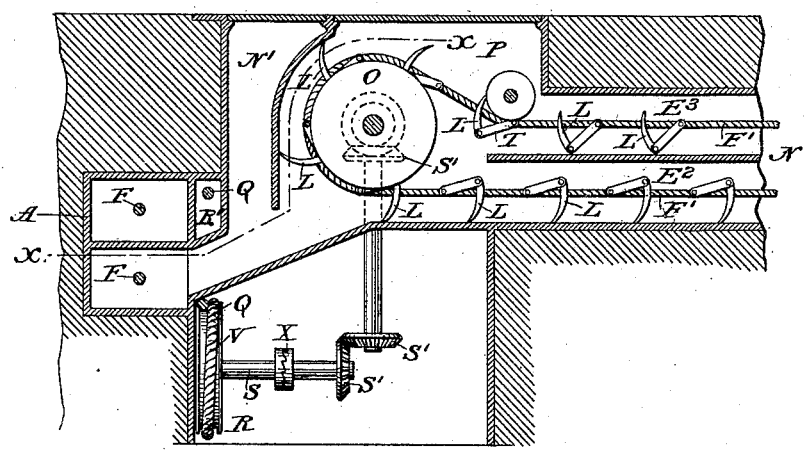
Figure 6:
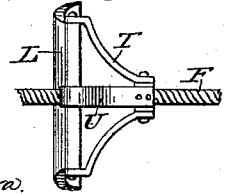
Figure 7:
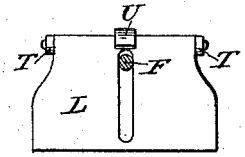

Figure 1 is a plan or diagram illustrating my system of collecting the refuse material in towns and cities; Fig. 2, a central vertical longitudinal section of the main conduit at its two ends; Fig. 3, a vertical transverse section through one of the supply-chutes by which the refuse matter is delivered to the conduit; Fig. 4, an irregular horizontal section taken transversely through the upper portion of the main conduit, and of the end of a lateral conduit discharging thereinto in line $xx$ of Fig. 5; Fig. 5, a vertical transverse section at the discharge end of a lateral conduit in line $yy$ of Fig. 4; Figs. 6 and 7, a detail plan and elevation, respectively, on an enlarged scale, of one of the conveying or propelling blades carried by the cables.

Similar letters indicate like parts in all of the figures.

My invention relates to an improved system for the collection and automatic conveyance to some suitable dumping-place of the ashes, garbage, sweepings, snow, and other solid or semi-liquid refuse material in the streets of large towns or cities.

It consists, broadly, in the combination, with a system of main subterranean tubes or conduits and with laterals emptying therein, of a series of endless carriers or conveying-cables fitted at proper intervals with conveying-blades, traveling continuously in the same direction and adapted to carry with them the intervening materials dropped into the conduits through suitable chutes and openings at the street-level above.

It consists, furthermore, in the mechanism for operating said cables from a central station, as is hereinafter described and claimed.

My system involves, first, the construction below the level of the street of a main conduit, A, to extend from any suitable starting-point directly along one of the streets or lanes of the city to a dumping-ground, at which the refuse from the streets may be properly collected for ultimate disposal, and of an engine-house, B, at one end of said main conduit, and of a wheel-house, C, at the opposite end thereof.

The conduit A is divided longitudinally by a horizontal partition, D, into two sections or compartments E and E'. The lower compartment, E, constitutes the conduit proper or discharging-main through which the refuse materials are swept forward to the dumping-chute W, (see Fig. 2,) and the upper compartment, E', serves as the tube through which the idle length of the conveying-cable is carried back to the starting-point.

The conveying-cable F is stretched through these two compartments, being carried at either end over suitable tension and driving drums or pulleys G H. The driving-drum G, located in the engine-house B, is geared by a belt, I, (see Fig. 2,) or in other suitable manner, to a motor, (not shown in the drawings,) and which may be of any approved description. The tension-drum H is mounted in bearings upon a carriage, J, moving freely in the wheel-house C upon a track laid parallel with the length of the conduit in a right line with the end thereof, and said carriage is automatically drawn outward against the stress of the cable by means of a weight, K, attached thereto by a cord, K', led over a suitable friction-pulley, $K^2$, as shown in Fig. 2.

Conveying blades or shovels L L L are attached at suitable intervals to the endless cable F in position to pass forward through the lower section or compartment, E, of the conduit, each with its lower and lateral edges in contact with or close proximity to the bottom and sides of said conduit, and to return freely with the cable through its upper section, E'.

Chutes M M (see Figs. 1 and 3) are provided at suitable intervals along the length of the conduit to open outwardly at the street-level and to communicate directly with the lower compartment, E, of the conduit, so that dirt, ashes, snow, and all manner of refuse matter may be readily dumped therein and be delivered by gravity into the conduit, to be caught and carried forward therein by the endless chain of shovels moving through the same. These chutes are provided with suitable covers hinged thereto or fitted loosely thereon to be closed when not in use.

In each side street or lane intersecting the street through which the main conduit is carried a lateral conduit, N, may be laid at a higher level than the main conduit A, so as to discharge freely therein. (See Figs. 4 and 5.)

Each lateral conduit N is divided longitudinally by a horizontal partition into two sections or compartments, $E^2$ $E^3$, to correspond with the main conduit, and a driving-pulley, O, is mounted at the end thereof next to the main conduit in a suitable chamber, P, constructed for its reception, as shown in Fig. 5. One end of the endless conveying-cable F', extending through the lateral conduit, is carried over this driving-pulley O, and the opposite end of the cable at the opposite end of the conduit is carried over an idle pulley or drum similar to the tension-drum H of the main cable, and which, like it, may be mounted upon a carriage, J, actuated by a weight, K, to produce a constant uniform tension upon the cable.

The driving-pulleys O O, actuating the conveying-cables of the several lateral conduits N N, are all operated by the one motor which drives the main cable, an auxiliary endless cable, Q, driven by said motor, being carried in a separate conduit, R R', formed alongside of the main conduit A to extend the length thereof. This driving-cable is carried upon and supported by suitable friction-rollers mounted at proper intervals in the auxiliary conduit.

At the mouth of each lateral conduit N a large pulley, V, is mounted in a compartment connected with the auxiliary conduit R R', and is geared to the cable Q so as to be driven thereby, and this pulley is fixed on a rotating shaft, S, which is geared by suitable beveled gear-wheels, S' S', to the shaft of the driving-pulley O of the lateral conveying-cable F'. (See Figs. 4 and 5.) The lateral conveying-cables F' F' are thus severally driven in unison with the main conveying-cable A by means of the driving-cable Q, carried alongside of the main conduit.

The lateral conduits N N are fitted with suitable chutes, N', in the same manner as the main conduit, and operate to convey to said main the refuse matter discharged into them through said chutes N'.

The conveying blades or shovels L L are preferably formed to fit quite closely against the bottom and sides of the lower section, E, of the conduit so as to prevent any accumulation or accretions of matter along the same. They are centrally slotted to permit of the passage of the conveying-cable F through them and to admit of vertical play thereon, and are each attached thereto by means of a bail or yoke, T, (see Fig. 4,) fitted to the ends of their upper edge and extending thence back to embrace and be secured centrally to the cable by a pivotal connection. Each blade or shovel is set at a slight angle forward, as shown in Figs. 2 and 5, and is made to bear with an elastic pressure upon the bottom of the conduit by means of spring U, secured at one end to the yoke and made to bear at its opposite curved end against the front of the shovel, as shown in Figs. 5 and 6.

To permit the movement of any of the lateral cables to be arrested independently of the movement of the main cable, suitable clutches, X X, are interposed in the gearing connecting said lateral cables with the driving-cable Q.

In the operation of my invention the conveying-cable F in the main conduit A is made to travel at a regular speed along the entire length of the conduit by the power of the motor, and to carry with it all refuse discharged into the conduit through the chutes M M, and deliver the same at its outer end under the outer pulley, G. In the meantime the conveying-cables F' F' in the lateral conduits N N are made to travel in like manner toward the main conduit A, so as to convey thereto and discharge therein the material emptied into said laterals, the lateral cables being driven as described in unison with the main cable by the same engine, through the agency of the auxiliary cables Q Q and the gearing by which the power is transmitted from said auxiliary cable to the drive-pulleys O O of the lateral cables, in manner as described.

By means of this apparatus all the refuse of a city may be collected and carried away quietly, rapidly, and without creating the noise, dirt, and dust in the streets incident to the present methods.

I claim as my invention—

1. The combination, in an apparatus for collecting and conveying street-sweepings, snow, and other refuse material in cities, of an underground main conduit, an endless carrier moving through said conduit, one or more lateral conduits communicating with said main conduit, an endless carrier moving through each lateral conduit, chutes communicating from the street-level with said main and lateral conduits, conveying-blades attached to the carriers, and mechanism, substantially as described, connecting the main and lateral carriers with a common motor to obtain a synchronous movement thereof, all substantially in the manner and for the purpose herein set forth.

2. The combination, in an apparatus for collecting and conveying street-sweepings, snow, and other refuse material in cities, of an underground main conduit longitudinally divided into two compartments, an endless conveying-cable moving forward through the lower compartment and returning through the upper compartment, conveying-blades attached to said cable, means, substantially as described, for operating said cables, and chutes communicating from the street-level with the lower compartment of the conduit, substantially in the manner and for the purpose herein set forth.

3. The combination, in an apparatus for collecting and conveying street-sweepings, snow, and other refuse material in cities, of an underground main conduit, an endless cable moving through said conduit, conveying-blades carried by said cable, lateral conduits communicating with said main conduit, an endless cable moving through each lateral conduit, conveying-blades carried thereby, a motor actuating the main cable, an endless auxiliary driving-cable carried in a conduit parallel with the main conduit and driven by said motor, and gearing, substantially as described, connecting said auxiliary cable with the driving-pulley of each lateral cable, substantially in the manner and for the purpose herein set forth.

4. The combination, substantially as described, with an endless cable, of a conveying-blade having a central slot to embrace the cable, and a connecting-yoke pivoted to the cable.

5. The combination, substantially as described, with an endless cable, of a conveying-blade having a central slot to embrace the cable, a connecting-yoke pivoted to the cable, and a spring attached to the yoke to bear upon the blade, substantially in the manner and for the purpose herein set forth.

In testimony whereof I have signed my name to this specification in the presence of two subscribing witnesses.

FREDERICK H. HAWKINS.

Witnesses:
A. N. JESBERA,
E. M. WATSON.